Feb. 23, 1965  J. N. MRGUDICH  3,170,817
IONICALLY CONDUCTIVE DEVICES FREE OF ELECTRODE POLARIZATION
Filed Jan. 24, 1961
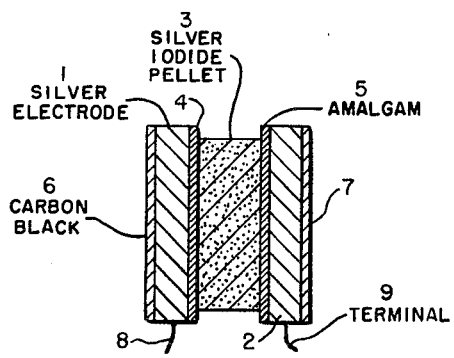
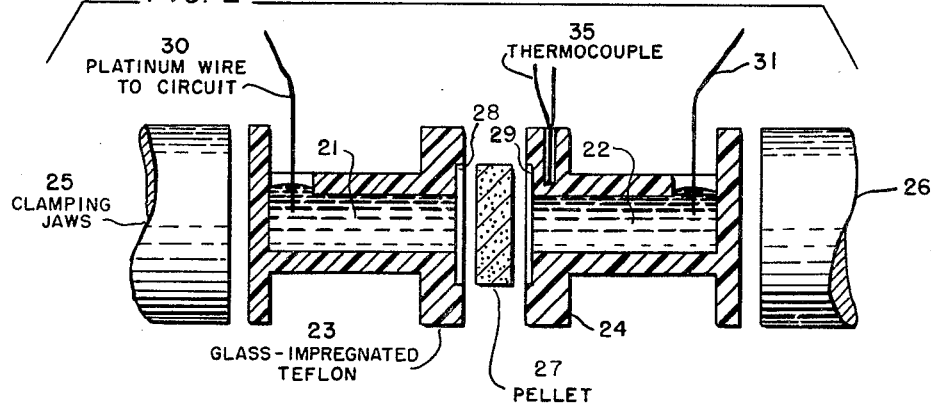
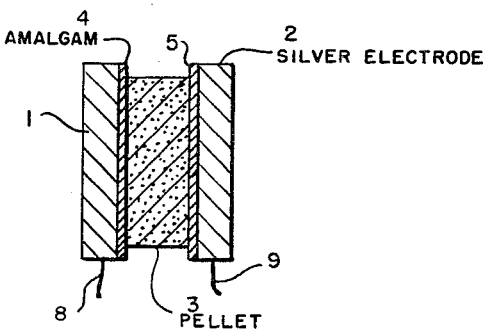
*INVENTOR,*
JOHN N. MRGUDICH.
BY
*Harry M. Saragovitz*
ATTORNEY.

United States Patent Office 3,170,817
Patented Feb. 23, 1965

3,170,817
IONICALLY CONDUCTIVE DEVICES FREE OF ELECTRODE POLARIZATION
John N. Mrgudich, Long Branch, N.J., assignor to the United States of America as represented by the Secretary of the Army
Filed Jan. 24, 1961, Ser. No. 84,737
7 Claims. (Cl. 136—4)
(Granted under Title 35, U.S. Code (1952), sec. 266)

The invention described herein may be manufactured and used by for the Government for governmental purposes without the payment of any royalty thereon.

This invention relates to new ionically conductive devices enabling a controlled, polarization-free transport of ions in a solid ionic conductor.

It has been known that if a D.C. voltage is applied across a solid ionic conductor the resultant flow of current decreases within a few minutes due to electrode polarization. If, for instance, a silver iodide pellet is assembled between two plain silver electrodes, pressed tightly against the opposite faces of the pellet and a small D.C. voltage (approximately 0.1 volt) is applied across these two silver electrodes the high initial current flow will gradually diminish and asymptotically approach a limiting value which is many times less than the initial surge. This time-decay of current under a constant applied D.C. voltage originates because the silver ions moving through the silver iodide pellet leave a deficiency of silver ions near the positive silver electrode and also pile up near the negative silver electrode. These abnormal charge distributions at the electrode interfaces set up field distortions which counteract and diminish the effect of the applied D.C. voltage and the device is now said to be polarized.

I now have found that a remarkably stable, polarization-free and controllable ionic current flow may be achieved in the device if the electrodes contacting the solid ionic conductor are amalgamated, provided the metal of the amalgamate corresponds to the cationic charge-carrier moving through the solid ionic conductor. Other conditions remaining unchanged the device having amalgamated electrodes will be found to pass several thousand times more current than the same device having unamalgamated electrodes. For a detailed description of experiments proving these contentions see J. N. Mrgudich, Conductivity of Silver Iodide Pellets for Solid-Electrolyte Batteries, Journal of the Electrochemical Society, v. 107, 1960, pp. 475–9.

One method of amalgamation of the silver electrode consists in rubbing pure mercury onto the faces of clean and polished silver discs. Residual scum is removed by rinsing the electrode with a few drops of pure mercury dropping from a burette. Excess mercury can be removed by shaking or by touching off against a second clean and previously amalgamated silver electrode. Other methods of amalgamation suggest themselves such as vacuum evaporation or condensation of mercury vapor, or treatment of the electrode with solutions of appropriate mercury salts, or by electroplating mercury onto the electrode. The above description of one preferred method of amalgamation should not be construed as limiting this invention to this one method.

The broad inventive idea will become more apparent from the following descriptions of various embodiments as shown in the accompanying drawing, in which FIG. 1 shows in cross-section an embodiment of the invention as a thermo-electric generator.

FIG. 2 shows in exploded view, partly in cross-section, an embodiment of the inventive device as a standard cell, and FIG. 3 shows in cross-section an embodiment in which the inventive device is used as an accelerometer.

The thermo-electric generator or thermo-converter of FIG. 1 consists of two silver electrodes 1 and 2 and a silver iodide pellet 3. The surfaces of the silver electrodes 1 and 2 which are in contact with the silver iodide pellet 3 are amalgamated as indicated by the layers 4 and 5 the thickness of which is exaggerated in the drawing. The free surface of the silver electrodes 1 and 2 are covered with a layer of carbon black 6 and 7 for better absorption of radiation.

If the silver electrode 1 is heated, for instance, by turning it towards the sun while the other electrode is kept at room temperature or cooled by artificial means the device will act as a thermo-generator delivering a voltage through the terminals 8 and 9.

If there would be no amalgam layers on the two silver electrodes the electrode 1 would soon build up a depletion zone preventing further silver ions from going into the silver iodide pellet and the electrode 2 would build up an excess positive charge preventing further silver ions from entering into the negative electrode and the voltage would rapidly go down. Besides, the consequent treeing of metallic silver would soon form a metallic connection from the negative to the positive plate and eventually short the device.

If, however, according to the invention amalgam layers 4 and 5 are provided, a clean, soft and semi-liquid electrode interface, consisting of silver dissolved in mercury will exist between the pellet and the respective electrodes and the silver ions will move freely from the negative silver electrode 1 through the silver iodide pellet 3 into the positive silver electrode 2.

The voltage of this thermo-converter will depend on the temperature difference between the two electrodes 1 and 2. Generally, it may be said that a difference of 50° C. will generate a voltage of 0.05 volt. Such a difference can easily be obtained by exposing the negative electrode 1 to the sun which may heat the electrode up to say 70° C. while the other electrode 2 is kept at room temperature of say 20° C.

The amperage will depend on the thickness of the silver iodide pellet and the area of the silver electrodes. If the thermo-generator according to the invention is manufactured in extremely miniaturized form and the electrode 1 is so thin that it is soon nearly depleted of silver the device may be reversed and electrode 2 will then serve as the negative electrode sending out silver ions to renew and regenerate the now positive electrode 2.

In the low-voltage standard cell as shown in the exploded view of FIG. 2 the two electrodes consist of liquid pools 21 and 22 containing a solution of silver in mercury held in vessels 23 and 24 of an appropriate insulating material such as glass-impregnated Teflon. The clamping jaws 25 and 26 tightly press the silver iodide pellet 26 into the recesses 28 and 29 of the vessels 23 and 24, thus forming a seal for the two liquid mercury-silver pools 21 and 22. Terminals 30 and 31 consisting of platinum wires lead to the circuit. A thermocouple 35 may be provided to indicate the temperature of the liquid silver-mercury electrode. If the two amalgam pools contain different amounts of dissolved silver, a concentration cell is set up which will give at constant temperature a constant though low voltage over an extremely long period of time.

The concentration cell according to the invention will operate below the normal freezing point and above the normal boiling point of the liquid electrolyte used in conventional standard cells.

The accelerometer shown in FIG. 3 has a structure similar to that of the thermo-generator shown in FIG. 1 and consists of silver electrodes 1 and 2 with amalgamated surfaces 4 and 5 which are in slight-pressure contact with the silver iodide pellet 3. Each of the silver electrodes 1 and 2 carries respective electric terminals 8 and 9 leading to a voltage meter not shown in drawing.

The application of mechanical forces such as spin, shock or vibration to such an accelerometer will induce changes in the transport of silver ions within the silver iodide which, since electrode polarization effects have been eliminated by electrode amalgamation, can be measured by a suitable voltmeter or oscilloscope.

The silver-amalgam electrodes may be produced in many different ways. For example, the electrodes may be made by intimate mixing and grinding of mercury with powdered metal and subsequently compressing or sintering the amalgamated powder into electrodes of various shapes and configurations and with porosities and surface characteristics best suited for a given application. Other applications might require intimate mixing of powdered, solid amalgam with inert materials such as powdered graphite or carbon black with subsequent compression into electrodes of required configuration and porosity.

Instead of amalgamated silver other amalgamated metals may be used as electrodes in conjunction with appropriate ionically conductive salts.

If, for instance, amalgamated copper is used as the electrodic material the conductive pellet would preferably consist of cuprous chloride which becomes completely ionically conductive for copper ions at temperatures of about 350° C. It is also possible, for instance, to use liquid sodium amalgam as the electrodic material whereby the ionically conductive pellet would consist of sodium chloride which is ionically conductive with respect to sodium ions at temperatures below 400° C.

The ionically conductive pellet may also consist of silver-mercuric iodide ($Ag_2HgI_4$) which is a solid at room temperature and conducts both silver ions and mercury ions. The solid $Ag_2HgI_4$ may therefore be also used in conjunction with silver amalgam electrodes. It should be noted, however, that the ionic conduction in this silver-mercuric iodide pellet consists of the greatest part (94%) of silver ions and only to a small extent (6%) of mercury ions.

The foregoing description of specific embodiments makes it clear that the general principle of the invention consists in the production of an ionically conductive device in which precisely known ionic charge carriers are free to move between non-polarizing electrodes with practically no tendency for electronic shorting by tree formation. It will therefore be evident to those skilled in the art that many modifications of this principle will be readily envisioned using all kinds of materials and combinations of such materials for special purposes.

What is claimed is:

1. An ionically conductive, non-polarizable device enabling a controlled transport of ions comprising a solid ionic conductor selected from the group consisting of silver halides and silver-mercuric halides, and placed between two identical amalgamated silver electrodes in contact with said ionic conductor.

2. An ionically conductive device, according to claim 1 in which the ionic conductor consists of silver iodide.

3. An ionically conductive device, according to claim 1 in which the ionic conductor consists of silver-mercuric iodide.

4. An ionically conductive device according to claim 1 in which the amalgamated silver electrodes consist of a solution of silver in mercury.

5. A heat operated electric generator comprising an ionically conductive device according to claim 1 and means for differentially heating the respective electrodes.

6. A concentration cell comprising an ionically conductive device according to claim 4 in which the concentration of silver in one liquid mercury electrode is higher than the concentration of silver in the other liquid mercury electrode and in which terminals are provided for connecting the electrodes to a circuit.

7. An accelerometer comprising an ionically conductive device according to claim 1 and terminals for connecting the amalgamated metal electrodes to a circuit.

References Cited by the Examiner
UNITED STATES PATENTS

| | | | |
|---|---|---|---|
| 1,393,739 | 10/21 | Benner et al. | 136—126.1 |
| 2,690,465 | 9/54 | Broder | 136—153 |
| 2,795,638 | 6/57 | Fischbach | 136—120 |
| 2,805,274 | 9/57 | Eisen | 136—120 |
| 2,882,329 | 4/59 | Liebhhfsky | 136—4 |
| 2,890,259 | 6/59 | Weininger | 136—4 |
| 2,897,568 | 6/61 | Weininger et al. | 136—153 X |
| 3,036,458 | 5/62 | Vali | 136—4 X |

OTHER REFERENCES

Fulton et al.: Fundamental Principles of Physical Chemistry, 1954, pages 561–553.

WINSTON A. DOUGLAS, *Primary Examiner.*

JOHN MACK, *Examiner.*